Feb. 18, 1941.  P. E. HAWKINSON  2,232,001
METHOD OF TREADING TIRE CASINGS
Filed Feb. 8, 1939  3 Sheets-Sheet 2

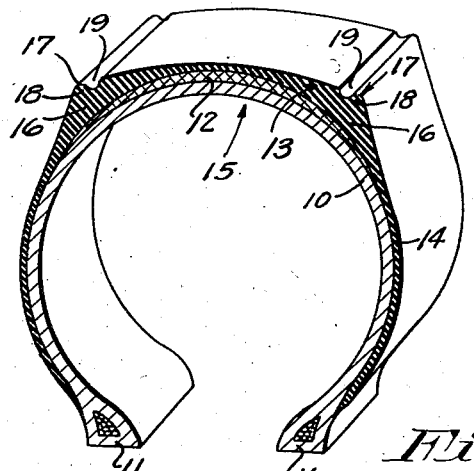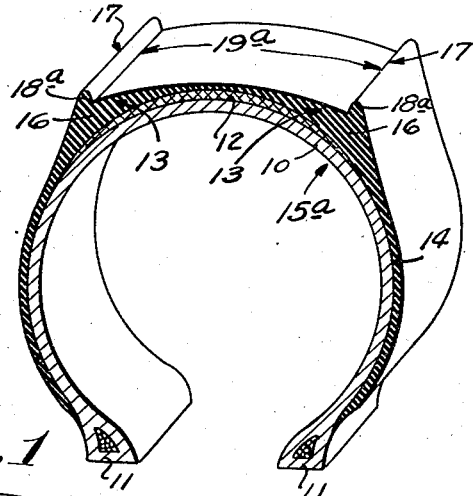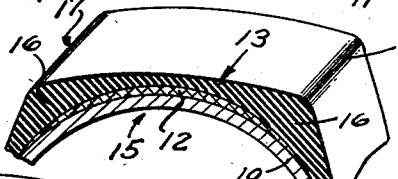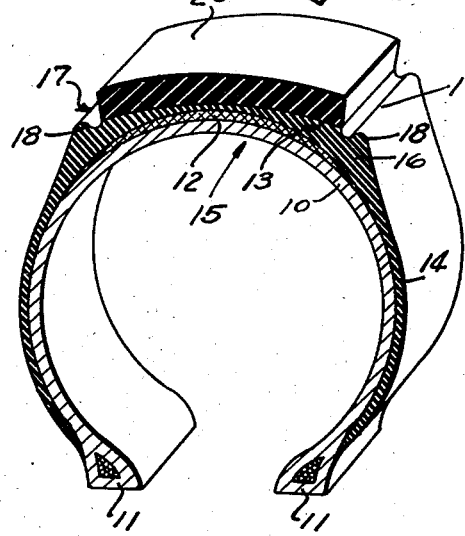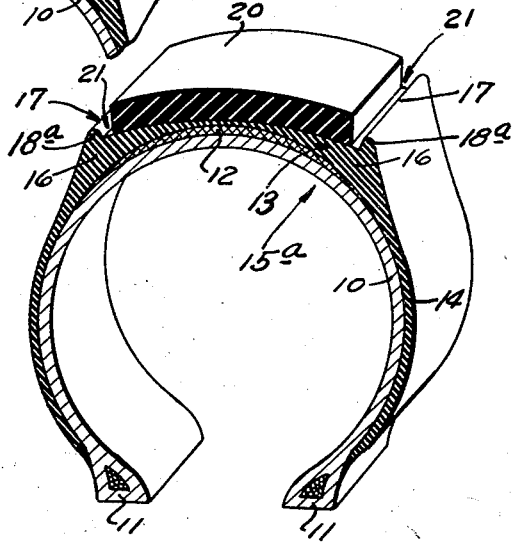

Inventor
Paul E. Hawkinson
By his Attorneys

Feb. 18, 1941.  P. E. HAWKINSON  2,232,001
METHOD OF TREADING TIRE CASINGS
Filed Feb. 8, 1939  3 Sheets-Sheet 3

Inventor
Paul E. Hawkinson
By his Attorneys
Merchant & Merchant

Patented Feb. 18, 1941

2,232,001

UNITED STATES PATENT OFFICE 2,232,001

METHOD OF TREADING TIRE CASINGS

Paul E. Hawkinson, Minneapolis, Minn., assignor to Paul E. Hawkinson Company, Minneapolis, Minn., a corporation of Minnesota Application February 8, 1939, Serial No. 255,268

6 Claims. (Cl. 154—14)

My present invention relates to improvements in the art of treading tires with annular molds which encircle the road-engaging crown tread portion of the tire and have an overall width that is less than the width of the road-engaging crown of the tire being treaded. More specifically stated, the invention relates to improvements in that type of tire treading referred to by the trade as "Hawkinson System" of treading, and which system of treading and the preferred equipment used in connection therewith is disclosed by me in my prior art Patents Nos. 1,917,261 and 1,917,262.

In practicing the retreading of tires in strict accordance with the teachings of my above identified prior patents, a band of additional tread material is applied to the smooth worn crown tread of a "bald-headed" tire intermediate the edges of the laterally spaced shoulder edges thereof and entirely radially outwardly of the original crown and shoulder tread of the tire, and then the tire is placed within and subjected to forming and curing heat and pressure in an annular mold that is of less overall width than the width of the bald crown and, hence, engages only the newly applied crown tread material and adjacent shoulders portions of the worn crown and does not engage any portion of the original tire casing radially inwardly of the bald crown.

For the purpose of clarity, it may be here stated that what is referred to in the art as a "baldheaded" tire is usually a tire on which the roadengaging crown tread configurations have been worn off or otherwise removed so that the roadengaging crown of the tire is relatively thin and smooth. As will hereinafter appear, the term "bald-headed" is herein also used with reference to tire casings which are originally manufactured with only a partial crown tread and in a condition, substantially corresponding to a tire that is worn to a "bald-headed" condition, with a view of having the final road-engaging tread applied thereto in a second operation in accordance with the "Hawkinson system."

The "Hawkinson system" when carried out as above briefly indicated and in strict accordance with the teachings of my prior patents above identified, has worked out with a very high degree of success insofar as actual service rendered is concerned, but there are certain objectionable features in connection with the satisfactory performing of the method and the resultant product which this invention seeks to and does overcome, these being as follows: (a) Operators of the system run into considerable difficulty first in applying a band of new tread material to the true center of the bald crown, since their only guide is the edges of the road-engaging crown at opposite shoulders which are not always sharply defined. In this connection it is important that the band of new tread material, which is usually cemented to the bald crown, be applied to the true center and in a perfect circle around the bald crown since if it be offset from the center or crooked it will make subsequent application of the mold to the true center of the crown difficult if not impossible. (b) Even assuming that the band of new tread material has been applied to the true center of the crown or that it be sufficiently narrower than the mold to permit of true centering of the mold on the bald crown in spite of the off-center of crooked condition, it is a difficult and tedious operation of the operator to truly center the mold on the bald crown using only the opposite edges of the bald crown as a guide and, of course, if true alignment of the mold is not effected, the ultimately cured new tread will wobble under rotation which is objectionable from the point of view of appearance, and the obtaining of satisfactory service from the tread. (c) Another somewhat objectionable characteristic from the point of view of appearance of tires treaded as above outlined in strict accordance with the teachings of my prior patents above identified is that the lines of joinder between newly applied road-engaging tread and the original bald crown are very obvious to even the casual observer, and detracts from the otherwise very neat appearance of the finished product.

In accordance with the instant invention the bald crown of a tire to be treaded is, preparatory to treading, formed immediately adjacent its opposite edges with radially and circumferentially extended ribs that are equally laterally spaced at all points about the circumference of a tire and are extended in true circles about the tire. The laterally spaced ribs serve firstly as guides for applying the band of new uncured tread material in a true circle about the true center of the bald crown; the usual practice being to utilize a strip of rubber of less width than the space between the ribs and to leave just sufficient space between the opposite edges thereof and the adjacent ribs to receive the marginal confining flanges or portions of the mold. It will be obvious that by utilizing these well defined laterally spaced ribs as guides, the matter of properly centering the tread strip will be easily accomplished. The second important function of the laterally spaced ribs described is the positive true centering of the mold over the bald crown and newly applied tread material; this being preferably accomplished by choosing a mold having laterally spaced marginal confining flanges just properly spaced to fit rather snugly between opposite preformed tread ribs and, of course, when these confining flanges are seated on the worn crown between the preformed tread ribs the said ribs will not only indicate a truly centered condition of the mold but will actually serve to return the mold in this position.

When tread has been vulcanized to the crown in a truly centered condition between the preformed tread ribs and the mold removed, there will be no wobbling of the tread under rotation, and the finished product will have a much neater appearance than tires treaded in strict accordance with teachings of my prior patents identified due to the further fact that the lines of joinder between the newly applied tread and original crown will be substantially hidden from view by the preformed tread ribs described.

In the accompanying drawings like characters indicate like parts throughout the several views.

Referring to the drawings.

Fig. 1 is a fragmentary sectional perspective view of a "bald-headed" tire;

Fig. 2 is a fragmentary perspective view illustrating a bald tire like that of Fig. 1 subsequent to the forming of the laterally spaced ribs by one of two methods herein described;

Fig. 2a is a view similar to Fig. 2 but illustrating the ribs formed by an alternative method;

Fig. 3 is a view showing the tire of Fig. 2 after having had a band of new tread material applied to the bald crown portion thereof intermediate the laterally spaced ribs;

Fig. 3a is a view corresponding to Fig. 3, but illustrating the band of new tread material applied to the tire casing of Fig. 2a.

Figure 4:
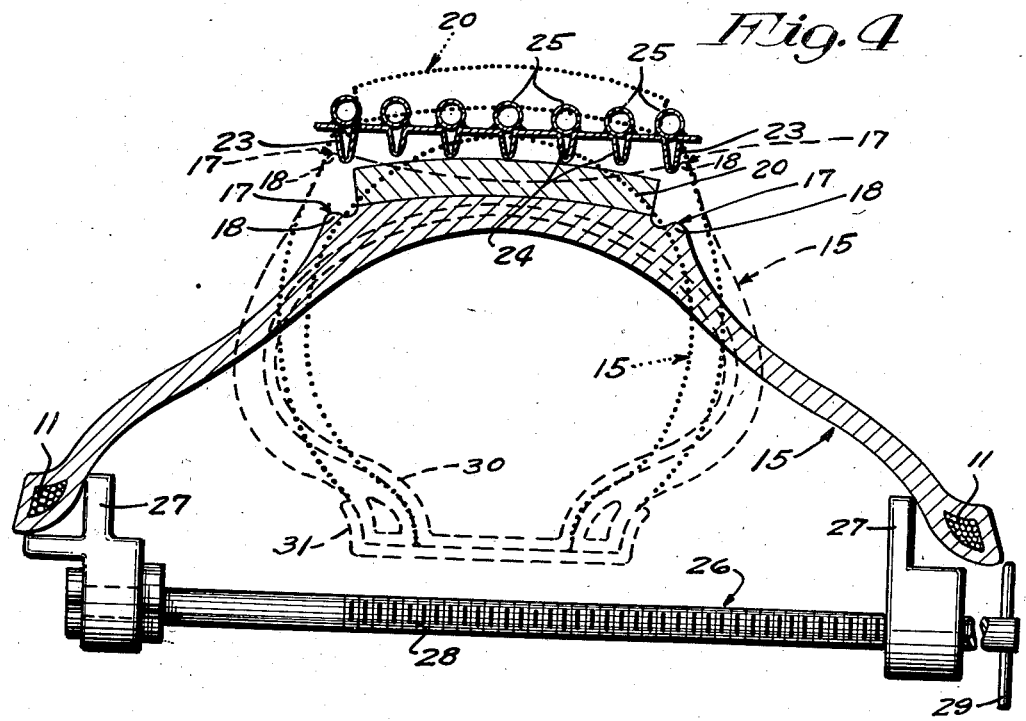
Fig. 4 is a view illustrating, among other things, the steps of inserting the tire into an annular mold of the variety disclosed in my prior patents, above identified, and by means of the preferred method disclosed in said patents.

The tire casings illustrated in the drawings are of the conventional character employed in connection with various vehicles such as automobiles, trucks, busses and the like, being made up of a flexible carcass 10 of laminated plies of cords and elastic rubber binder and formed with rim-engaging bead portions 11, a breaker strip 12 applied over the crown of the carcass, a tread material 13 applied over the crown portion of the carcass and breaker strip 12, and a side wall covering 14.

Figure 9:
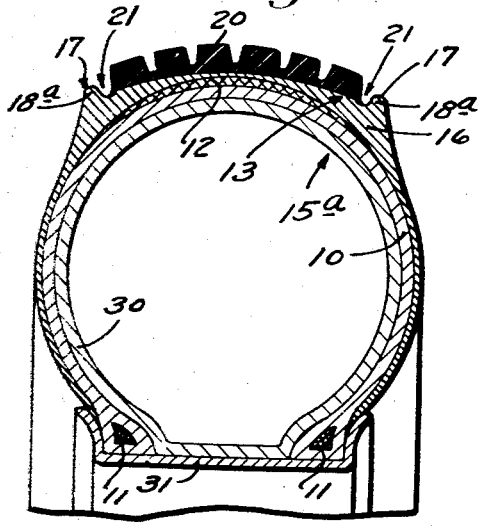
Fig. 9 is a view very similar to Fig. 8 but illustrating the tire of Figs. 2a and 3a after the treading operation is complete.

The tire casing of Figs. 1 to 5 inclusive and 8 is indicated as an entirety by 15 and the tire casing of Figs. 2a, 3a and 9 is indicated as an entirety by 15a. As previously indicated, Fig. 1 is representative of a tire that is worn down in service to the condition known as "bald-headed" and in which condition it will be noted by reference to Fig. 2, that the laterally spaced shoulder portions 16 of the crown tread material 13 are relatively very thick as compared to the intermediate portion of the crown tread 13. When a tire is worn to the condition illustrated in Fig. 1, it engages the road between the opposite laterally spaced edges 17 of the shoulder portions of the crown tread and, hence, this surface lying between the laterally spaced edges 17 may hereinafter be referred to as the road-engaging crown portion or surface of the tire tread.

The invention will be first considered in connection with the retreading of a tire that has been worn to a "bald-headed" condition as illustrated in Fig. 1. The first step in the process of retreading tires in accordance with this invention consists in forming in the original crown tread material 13 of a tire at the opposite thick shoulder portions 16 thereof, radially projecting and circumferentially extending ribs indicated by 18 in Figs. 2 to 5 inclusive and 8, and by 18a in Figs. 2a, 3a and 9.

The ribs 18 of Figs. 2 to 5 inclusive and 8 are formed by cutting in the opposite shoulder portions 16 of the original crown tread material, in laterally inwardly spaced relation to the extreme edges 17 thereof, annular grooves or channels 19. These grooves or channels 19 may be formed in any suitable manner but this can very readily be accomplished through the use of a suitably shaped rotary grindstone or other rotary cutting tool. It is important that these channels be cut in true circles about the circumference of a tire and in parallel relation to the true center line thereof so that the ribs 18 formed thereby will afford true guides for the subsequent operations of placing the new uncured tread stock and mold on the tire.

If in carrying out this first step it is desired to form the tire as illustrated in Figs. 2a and 3a, the ribs 18a are formed by cutting down the intermediate portion of the original crown tread material 16 to form a wide intermediate channel 19a defined at its opposite edges by the resulting radially projecting and circumferentially extending ribs 18a. Here again it is important that this channel 19a be of uniform width through the circumference of the tire and extend in a true circle about the true center of the tire so that the resulting ribs 18a will serve as true guides for the later tread material and mold applying operations.

Whether the ribs 18 or 18a will be complete and unbroken circumferentially of the tire or will be broken up circumferentially of the tire will depend entirely upon the shoulder design of the particular make of tire being treaded. However, this will not have any bearing upon the successful practice of the invention.

The next step in the process consists in applying to the original crown tread material of the tire intermediate the ribs 18 or 18a, as the case may be, a band of uncured new tread material 20. In the case of applying the tread material to a tire pre-ribbed in the manner shown in Figs. 2 and 3, a tread stock having the width corresponding to the space between the opposite channels 19 will be chosen, and this will usually be cemented in place upon the road-engaging crown tread. Of course, in applying this band of tread material, the shoulders 18 and channels 19 will serve as accurate guides for applying the tread material in a true circle about the true center of the crown. In the case of applying the tread material to a tire pre-ribbed in the manner shown in Figs. 2a and 3a, a tread stock of somewhat less width than the overall width of the crown intermediate the ribs 18a will be applied to the crown in the center of the channel 19a defined by the ribs 18a. In this instance, the tread material should be of such width that when centered, it will leave laterally spaced channels 21 adjacent opposite edges of the newly applied material and intermediate the same and the ribs 18a for reception of the confining flanges of the mold to be hereinafter described.

The next step in the preferred process consists in forming a suitable design in and carrying the newly applied crown tread material 20 to the original crown tread material. For this purpose a mold of the type disclosed and broadly claimed in my prior art Patent No. 1,917,262 is preferably employed, such a mold being indicated as an entirety by 22. This mold is in the nature of an annular ring formed at its opposite marginal portions with radially inwardly projecting annular retaining surfaces, in the nature of annular flanges 23, and intermediate the retaining flanges 23 with radially inwardly projecting design forming surfaces 24, which latter surfaces according to the present illustration are also in the nature of annular flanges. For the purpose of heating the mold 22, there is applied about the exterior thereof a suitable steam conduit or conduits 25. Assuming that the mold described is of the single non-divisible section type built in accordance with the preferred embodiment of the invention disclosed in my prior patent identified, the tire crown portion of the tire and its applied tread material must be reduced in circumference and diameter in order to permit application of the mold which will have a minimum internal diameter less than the normal overall diameter of the tire. In fact, in accordance with the teaching of my above identified prior art patents, the normal diameter of a tire to be treaded in one of the molds will preferably be somewhat greater than the maximum internal diameter of the mold so that the crown portion of the tire and its newly applied tread material will be maintained in a circumferentially and diametrically contracted condition during the curing operation. This may be assumed to be accomplished in accordance with the teachings of my prior patents identified and which is as follows: The beads 11 of the tire will be spread apart until the circumference of the crown portion of the tire and its newly applied tread material are reduced sufficiently to permit initial entrance of the tire into the mold. This may be accomplished on any suitable tire spreading device but is illustrated in Fig. 4 as being accomplished by application of a plurality of hand spreading devices 26 applied at circumferentially spaced points, so that the beads will be uniformly spread throughout their circumference. These spreading devices 26, as illustrated, are made up of opposite bead engaging lugs 27 connected by a suitable screw threaded bolt 28. The bolt 28 is journaled in and held against axial movement with respect to one of the lugs 27 and is screw threaded in the other lug 27 and provided therebeyond with a suitable hand piece 29.

Figure 5:
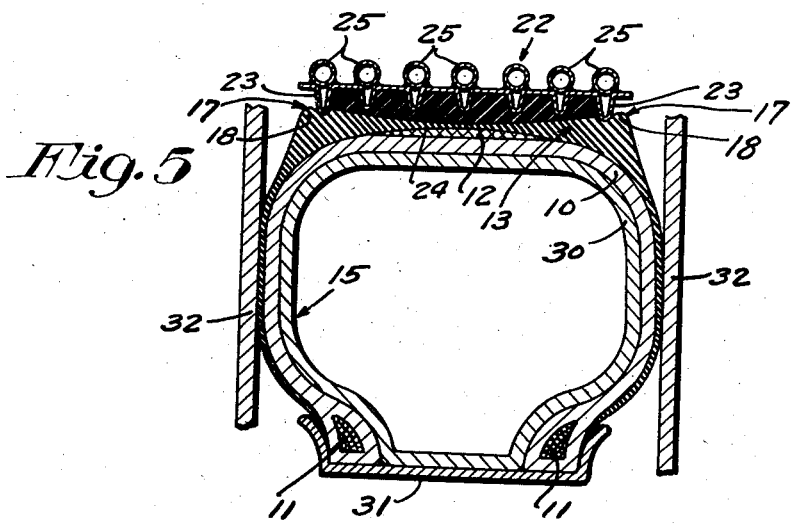
Fig. 5 is a sectional view illustrating the tire positioned in the mold as during the curing operation.
Figure 6:
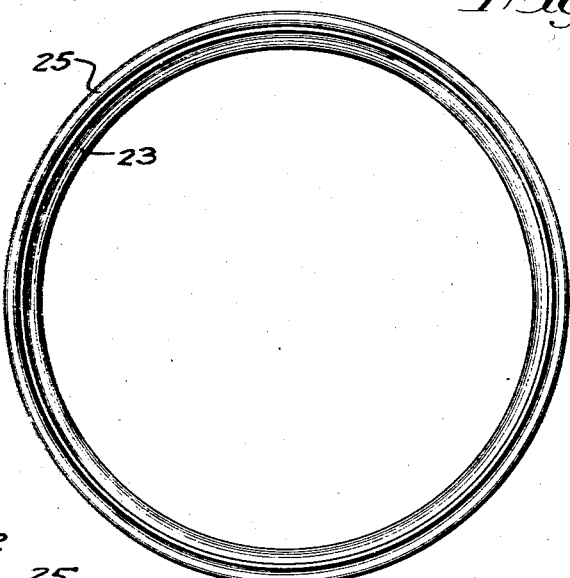
Fig. 6 is a view in side elevation of one of the complete molds.
Figure 7:
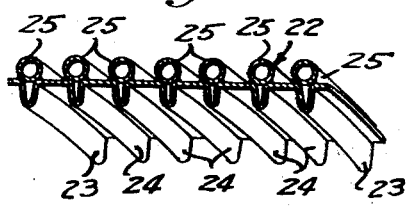
Fig. 7 is a fragmentary sectional perspective view of one of the molds.

In Fig. 4 the normal contour and relative diameter of the tire with its newly applied tread material with respect to the mold is illustrated by one of two super-imposed dotted line positions; whereas in the cther of the two super-imposed dotted line positions, the tire is indicated in its curing position more clearly represented in Fig. 5. Also, in Fig. 4 the maximum contracted mold entering condition of the tire is indicated by full lines.

The tire casing will first be laterally expanded and circumferentially contracted as shown particularly by full lines in Fig. 4. Then, when the mold is centered over the crown and newly applied tread material, the beads of the tire will be released from lateral expansion so as to permit the tire to exert its full expansive energy against the minimum diameter surface of the mold.

When this is done an air bag or ordinary inner tube, indicated by 30, is placed within the tire casing and an ordinary tire rim 31 applied. Suitable side pressure plates 32 are now brought to bear upon the side walls of the casing to relieve the same of excessive pressures and then the inner tube is charged with air pressure to the extent of one hundred to one hundred and fifty pounds, for example, which will cause the newly applied uncured tread material to form around the design forming surfaces 24 of the mold and seat the retaining flanges 23 of the mold on the original crown tread material of the tire immediately adjacent the preformed ribs 18 or 18a. If the mold does not completely form about the newly applied tread material and positively seat its confining flanges as described under preliminary internal expanding pressure of the tire, this will be accomplished almost immediately upon application of vulcanizing heat to the mold, which is accomplished by injecting steam through the conduit or conduits 25, and causes a free flowing of the newly applied rubber.

As previously stated, the mold chosen will preferably be of such a width that it will fit snugly between the preformed ribs 18 or 18a, which is important in that the ribs will then serve not only as preliminary guides in applying the mold but will also serve later as means for retaining the mold against lateral slippage which is apt to take place during the brief period after the heat is applied to the mold when the newly applied tread stock reaches a free flowing condition. Here, as in my prior patents identified, the confined flanges 23 of the mold make sealing contact with the original crown tread material of the tire so as to positively confine the tread material between the edges 17 of the original crown tread material.

While the invention has herein been described in connection with retreading of worn tires, it may be practiced, and in fact is being commercially practiced, in the manufacture of new tires. In practicing the invention in connection with new tires, the tire is originally manufactured and cured with only a partial crown tread but with ribs corresponding to the ribs 18 or 18a. The tire thus pre-cured and pre-ribbed then has the balance of its road-engaging tread applied in accordance with the "Hawkinson system" and in accordance with the combined teachings of my prior art patents and the present invention. Regardless, however, whether the invention is practiced with new and ribbed tires or in connection with worn and ribbed tires, the new tread is always vulcanized to a pre-cured tire.

Figure 8:
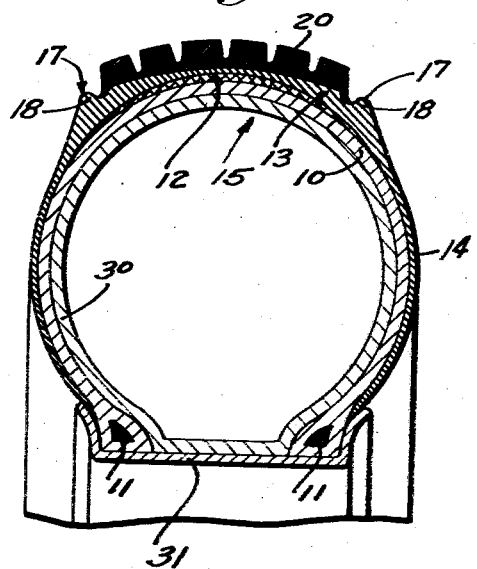
Fig. 8 is a sectional view illustrating the tire of Figs. 2 and 3 after the treading operation is complete and the tire subjected to pressure for service.

After the curing operation is complete, the tire will be removed from the mold preferably by repeating the bead spreading process illustarted best in connection with Fig. 4, and when removal and inflated for service, the tire will appear as illustrated in Figs. 8 or 9, depending upon whether the tire be pre-ribbed in the manner illustrated in Figs. 2 and 3 or in the manner illustrated in Figs. 2a and 3a.

What I claim is:

1. The method of adding a band of new road-engaging crown tread material to a pre-cured tire casing, having a cured but incomplete crown tread formed at the opposite edges of its crown surface with radially projecting and circumferentially extending ribs, which consists in applying to the crown tread of the tire intermediate said ribs an annular band of uncured tread material that is of less width than the space between said previously formed ribs and with its edges spaced from adjacent preformed ribs so as to leave laterally spaced annular channels therebetween and the pre-formed ribs, and thereafter applying about the newly applied tread material an annular mold having radially inwardly projecting circumferentially extended tread material confining flanges at its marginal portions that are laterally spaced a distance corresponding to the space between the said channels formed on the tire casing between the newly applied tread material and preformed ribs, in thereafter bringing the confining flanges of the mold into line sealing contact with the crown tread of the tire forming the bottoms of said channels and producing radial compression between the newly applied crown tread material and intermediate portions of the mold, and finally applying heat to the mold to cure the newly applied crown tread material to the crown of the casing.

2. The method of treading a tire casing which consists in forming in the crown tread material of a pre-cured tire casing adjacent opposite shoulders thereof laterally spaced circumferentially extended and radially projecting ribs, in applying to the crown tread of the tire intermediate said ribs an annular band of uncured tread material that is of less width than the space between said previously formed ribs and with its edges spaced from adjacent preformed ribs so as to leave laterally spaced annular channels therebetween and the pre-formed ribs, and thereafter applying about the newly applied tread material an annular mold having radially inwardly projecting circumferentially extended tread material confining flanges at its marginal portions that are laterally spaced a distance corresponding to the space between the said channels formed on the tire casing between the newly applied tread material and preformed ribs, in thereafter bringing the confining flanges of the mold into line sealing contact with the crown tread of the tire forming the bottoms of said channels and producing radial compression between the newly applied crown tread material and intermediate portions of the mold, and finally applying heat to the mold to cure the newly applied crown tread material to the crown of the casing, whereby the preformed ribs serve primarily as guides in applying the new tread material and mold to the true center of the tire crown and later serve to retain the mold against lateral slippage.

3. The method of producing a tire casing which consists in initially building up a tire casing and curing the same with an incomplete crown tread material formed at the opposite edges of its crown surface with radially projecting and circumferentially extending ribs that define the margins of the crown surface, in thereafter applying to the crown of the precured and pre-ribbed tire intermediate side ribs an annular band of uncured tread material that is of less width than the space between said previously formed ribs and with its edges evenly spaced from adjacent pre-formed ribs so as to leave laterally spaced annular channels therebetween and the preformed ribs, and thereafter applying about the newly applied tread material an annular mold having radially inwardly projecting circumferentially extended tread material confining flanges at its marginal portions that are laterally spaced a distance corresponding to the space between the said channels formed on the tire casing between the newly applied tread material and preformed ribs, in thereafter bringing the confining flanges of the mold into line sealing contact with the crown tread portion of the tire forming the bottoms of said channels and producing radial compression between the newly applied crown tread material and intermediate portions of the mold, and finally applying heat to the mold to cure the newly applied crown tread material to the crown of the casing, whereby the preformed ribs serve primarily as guides in applying the new tread material and mold to the true center of the tire crown and later serve to retain the mold against lateral slippage.

4. The method of retreading tire casings that have been worn down to a smooth "bald-headed" condition which consists in cutting down the original crown tread material closely adjacent but laterally inwardly spaced from the extreme edges of the original crown tread surface to form immediately adjacent edges of the crown surface radially projecting and circumferentially extending ribs, in thereafter applying to the original crown tread of the tire intermediate said ribs an annular band of uncured tread material that is of less width than the space between said previously formed ribs and with its edges evenly spaced from adjacent preformed ribs so as to leave laterally spaced annular channels therebetween and the preformed ribs, and thereafter applying about the newly applied tread material an annular mold having radially inwardly projecting circumferentially extended tread material confining flanges at its marginal portions that are laterally spaced a distance corresponding to the space between the said channels formed on the tire casing between the newly applied tread material and preformed ribs, in thereafter bringing the confining flanges of the mold into line sealing contact with the crown tread of the tire forming the bottoms of said channels and producing radial compression between the newly applied crown tread material and intermediate portions of the mold, and finally applying heat to the mold to cure the newly applied crown tread material to the crown of the casing, whereby the preformed ribs serve primarily as guides in applying the new tread material and mold to the true center of the tire crown and later serve to retain the mold against lateral slippage.

5. The method of retreading tire casings, the road-engaging crown surfaces of which have been worn down to a smooth "bald-headed" condition which consists in first cutting down the intermediate portion of the crown surface of the original crown tread material to form a wide annular channel defined at opposite edges by radially projecting and circumferentially extending ribs, in applying to the original crown tread of the tire centrally of said channel an annular band of new tread material that is of less width than the channel and will form between its opposite edges and said ribs narrow annular channels, and thereafter applying about the newly applied tread material an annular mold having radially inwardly projecting circumferentially extended tread material confining flanges at its marginal portions that are laterally spaced a distance corresponding to the space between the said channels formed on the tire casing between the newly applied tread material and preformed ribs, in thereafter bringing the confining flanges of the mold into line sealing contact with the crown tread of the tire forming the bottoms of said channels and producing radial compression between the newly applied crown tread material and intermediate portions of the mold, and finally applying heat to the mold to cure the newly applied crown tread material to the crown of the casing, whereby the preformed ribs serve primarily as guides in applying the new tread material and mold to the true center of the tire crown and later serve to retain the mold against lateral slippage.

6. The method of retreading tire casings, the crown tread surfaces of which have been worn down to a smooth "bald-headed" condition, which consists in cutting in the original road-engaging crown tread material closely adjacent but laterally inwardly spaced from opposite edges of the road-engaging crown surface thereof to form relatively narrow annular channels and radially projecting and circumferentially extending ribs in the original crown tread material at opposite edges of crown surface thereof, and thereafter applying to the original crown tread material intermediate said channels a band of new tread material while employing the laterally spaced ribs and channels as guides for applying the new material to the true center of the crown, and thereafter applying about the newly applied tread material an annular mold having radially inwardly projecting circumferentially extended tread material confining flanges at its marginal portions that are laterally spaced a distance corresponding to the space between the said channels formed on the tire casing between the newly applied tread material and preformed ribs, in thereafter bringing the confining flanges of the mold into line sealing contact with the crown tread of the tire forming the bottoms of said channels and producing radial compression between the newly applied crown tread material and intermediate portions of the mold, and finally applying heat to the mold to cure the newly applied crown tread material to the crown of the casing, whereby the preformed ribs serve primarily as guides in applying the new tread material and mold to the true center of the tire crown and later serve to retain the mold against lateral slippage.

PAUL E. HAWKINSON.